United States Patent Office 2,802,660
Patented Aug. 13, 1957

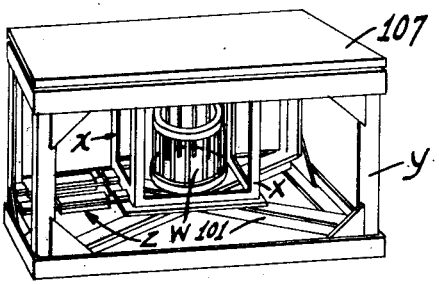
Fig_1
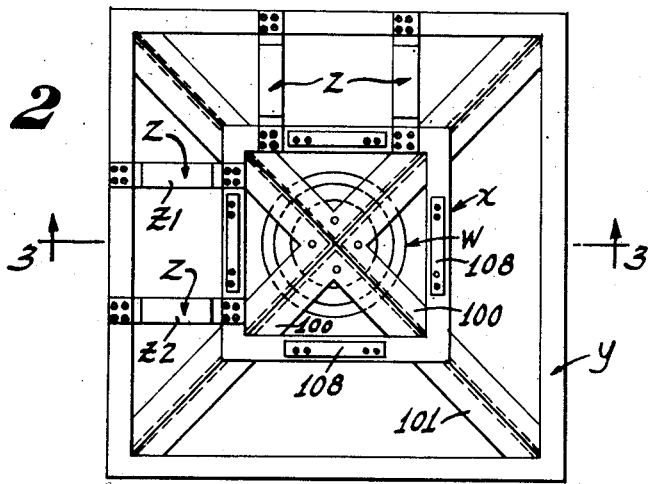
Fig_2
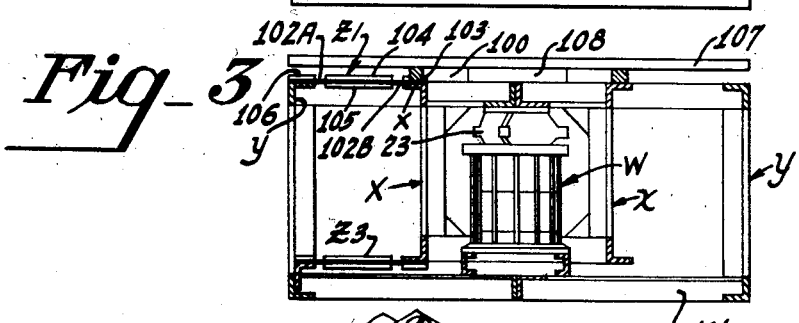
Fig_3
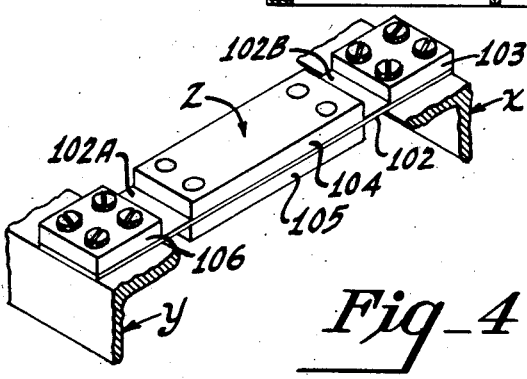
Fig_4
INVENTOR.
John C. Williams, Jr.
BY Harry Sangsam
ATTORNEY Aug. 13, 1957 J. C. WILLIAMS, JR 2,802,660
WEIGHING PLATFORM FOR A WEIGHING DEVICE
Filed Dec. 22, 1953 2 Sheets-Sheet 2
*Fig_5*
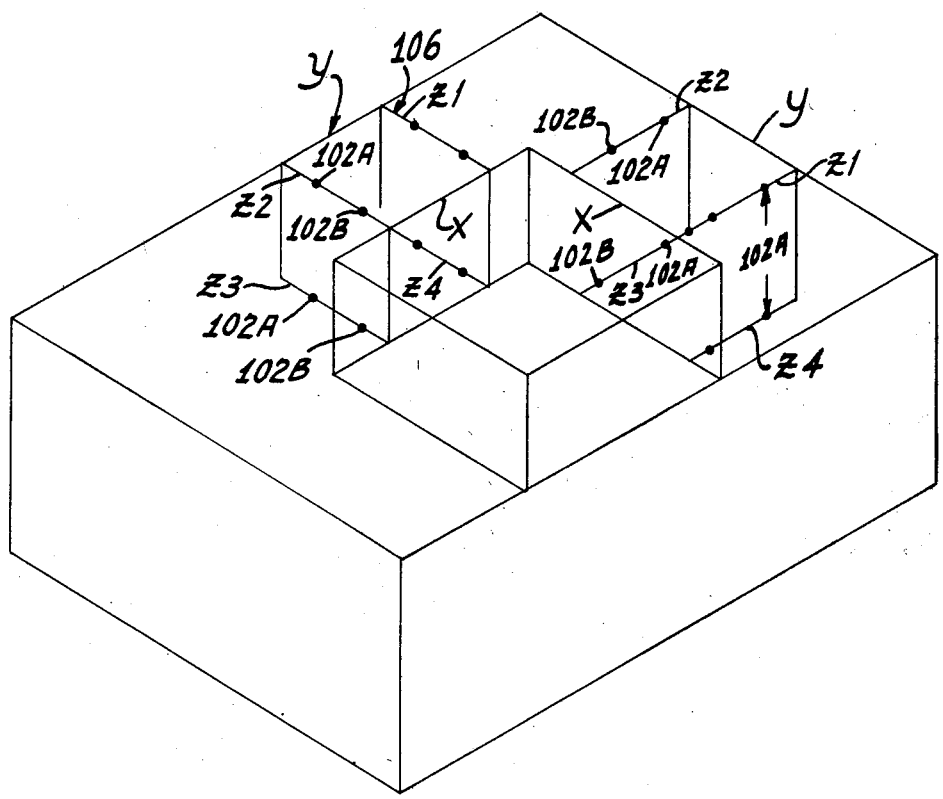
*Fig_6*
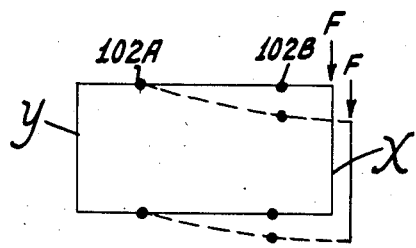
INVENTOR.
John C. Williams, Jr.
BY *Harry Sangean*
ATTORNEY

2,802,660

WEIGHING PLATFORM FOR A WEIGHING DEVICE

John C. Williams, Jr., Philadelphia, Pa., assignor to CDC Control Service, Inc., Hatboro, Pa., a corporation of Pennsylvania Application December 22, 1953, Serial No. 399,713

2 Claims. (Cl. 265—71)

My invention relates to a weighing platform and relates particularly to a platform which is flexibly supported and which does not utilize any fulcrums.

Heretofore, pneumatic weighing units, such as those disclosed in the pending patent application of Charles D. Close and Dominic J. Rossi and John C. Williams, Jr., Serial No. 410,884 filed February 17, 1954 have been used. However, it has been found necessary to place bulky articles upon the pneumatic weighing unit and since the unit is relatively small when compared with the article this has resulted in difficulty in placing a large article upon a small weighing unit.

With my invention I provide a relatively large platform combined with a small weighing unit wherein an accurate weight will be obtained.

Another object of my invention is to provide a relatively large platform supported from a frame by a plurality of bars which are rigidly held at their ends but which are flexibly held intermediate their ends.

Another object of my invention is to provide a floating weighing platform wherein the downward thrust no matter where placed on the platform will be transmitted in a vertical plane to the measuring device.

Another object of my invention is to provide a load weighing platform wherein the magnitude of a load or a force may be determined with a high degree of sensitivity and of accuracy.

Another object of my invention is to provide a load weighing platform which may be used with a load cell, a pneumatic weighing machine, or a spring scale.

Another object of my invention is to provide a weighing platform wherein torque will not be transmitted to the weighing element and wherein errors due to friction cannot take place.

Another object of my invention is to provide a weighing platform where there are no friction or wearing surfaces.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a perspective view of a weighing scale embodying my invention.

Fig. 2 is a plan view of the scale.

Fig. 3 is a sectional view of the scale taken along the line 3—3 of Fig. 2.

Fig. 4 is a perspective view of the flexible supporting members.

Fig. 5 is a schematic view showing the inner and outer frames held by a plurality of flexible connecting members.

Fig. 6 is a schematic view showing the flexing of the frame with the application of a load or force.

Referring now in detail to the drawings wherein similar reference characters refer to similar parts, I show a weighing determining unit W embraced by a weighing platform 107 which will be subsequently described in greater detail.

In certain applications employing the weight determining unit W, such as pneumatic unit or a load cell 23, it is necessary to employ a relatively large weighing platform, in such applications the unit W is mounted within a rigid inner structural framework, generally designated as X, in the shape of a parallelpiped as illustrated in Fig. 1. The rigid framework which floats as a unit is mounted within a second or outer structural framework, generally designated as Y, also in the shape of a parallelpiped. A pair of cross angle iron members 100 at the top of the inner structural framework X rest on and are supported by the thrust transmitting unit of the weighing machine W, while rigid cross members 101 at the bottom of the outer structural framework Y support the machine W.

Definite vertical space relationship between the structural framework X and structural framework Y is maintained by a plurality of flexible units, each of which is generally designated as Z or with the prefix Z. The flexible members Z are arranged to offer little or no resistance to a limited vertical movement of the central structural framework X and at the same time they definitely resist horizontal movement of the central structural framework X within the outer structural framework Y.

The flexible unit Z, illustrated in Fig. 4, comprises a center flexible strip, plate, or member 102 reinforced to resist lateral thrust on the unit by an upper plate 104 and a lower plate 105 rigidly mounted upon the member 102 parallel to the plate 104. The ends of the flexible unit Z are securely affixed to the horizontal angle structural members of the outer structural frame Y and the inner structural frame X by means of clamping blocks 106 and 103, respectively.

The flexible members Z are held rigidly at their ends by blocks 103, 106 but are flexible at the transverse lines 102A, 102B which are spaced a distance apart equal to the length of the parallel bars 104, 105.

The weight transmitted may be registered upon a pneumatic scale or a load cell which indicates the amount of resistance in an electric circuit and is a function of elongation of a prefixed length of wires.

A pair of flexible member arms Z1 and Z2 are positioned on adjacent sides and between the inner structural frame X and outer structural frame Y as illustrated in Figs. 1 and 2. Two of the flexible members Z1, Z2 being at the top and two of the flexible members Z3, Z4 being at the bottom, between adjacent sides of the structural framework X and structural framework Y.

A platform 107 secured to the top of the inner structural framework X with spacer blocks 108 interposed between the plate 107 and the inner framework X is arranged to receive the article to be weighed. With the arrangement as described above, of the weight determining machine W in relation to the inner framework Y and outer framework X and spacing units Z, any downward thrust occasioned by the placing of a product or article on the plate 107, regardless of the position of the product or article on the plate, is resolved into a vertical downward thrust on the weight determining machine W, and any side or unbalance thrusts set up by the non-central location of the article or product on the plate 107 is resolved into horizontal thrusts that are resisted by the flexible members Z.

As the flexible units resist horizontal thrusts only the vertical thrust created by the article or product on the plate 107 is transmitted to the weight determining machine W by the upper cross members 100 of the inner structural frame X as a vertical downward thrust.

It is only necessary for the central portion of the machine to rise a few thousandths of an inch to enable the machine to accurately evaluate the weight of the product or article supported by the machine.

To better understand the operation of my invention the scale platform embodies an inner rigid parallelpiped mounted upon a plurality of parallel spaced flexible arms which change their position from a parallelogram to a rhomboid upon the introduction of a weight. That is to say the rigid vertical members of X, Y, viewing Fig. 3, are parallel to one another and are joined by parallel horizontal flexible members Z1, Z3 to form a parallelogram but the frame X moves with respect to the stationary frame Y when a weight is imposed. Hence, the inner frame X floats vertically with respect to the outer frame Y when a load is placed upon the inner frame X (see Fig. 6).

Although my invention has been described in considerable detail, such description is intended as being illustrative rather than as limiting, as the invention may be variously embodied, and the scope of the invention is to be determined as claimed.

I claim as my invention:

1. A weighing platform structure comprising a rigid outer three dimensional framework having rigid lower and upper framework peripheral members and a plurality of uprights connecting said members, an inner rigid three dimensional framework having rigid lower and upper peripheral members and a plurality of uprights connecting said inner lower framework member and the inner upper peripheral framework member, a pair of flexible arms connecting the lower inner peripheral framework member to the lower outer peripheral framework member, a pair of flexible arms located directly above said first named pair of flexible arms and connecting said upper inner peripheral framework member to said upper outer peripheral framework member, a third and fourth pair of flexible arms joining said outer framework to said inner framework wherein said first and second pair of flexible arms are located in a plane approximately 90° to one side of said third and fourth pair of flexible arms respectively.

2. The invention of claim 1 including an elongated weighing device wherein said weighing device is rigidly fixed at one end to the outer framework and its other end is engaged by said second framework whereby the relative movement of said other end will indicate the movement of said inner framework with respect to said outer framework.

References Cited in the file of this patent

UNITED STATES PATENTS

| | | |
|---|---|---|
| 1,887,169 | Ross | Nov. 8, 1932 |
| 1,895,502 | Vernet et al. | Jan. 31, 1933 |
| 1,968,988 | Bousfield | Aug. 7, 1934 |
| 2,054,447 | Ross | Sept. 15, 1936 |
| 2,516,545 | Brewster | July 25, 1950 |
| 2,584,950 | Weckerly | Feb. 5, 1952 |
| 2,593,237 | Adams | Apr. 15, 1952 |
| 2,646,274 | Weckerly | July 21, 1953 |
| 2,649,294 | Walter | Aug. 18, 1953 |
| 2,678,207 | Wheeler | May 11, 1954 |
| 2,698,747 | Stelzer | Jan. 4, 1955 |

FOREIGN PATENTS

| | | |
|---|---|---|
| 332,332 | Great Britain | July 24, 1930 |
| 598,580 | Germany | June 13, 1934 |